(12) United States Patent
Hebborn

(10) Patent No.: US 8,836,244 B2
(45) Date of Patent: Sep. 16, 2014

(54) AUTOMATIC INPUT IMPEDANCE CONTROL

(71) Applicant: Dialight Corporation, Farmingdale, NJ (US)

(72) Inventor: Kevin A. Hebborn, Toms River, NJ (US)

(73) Assignee: Dialight Corporation, Farmingdale, NJ (US)

( * ) Notice: Subject to any disclaimer, the term of this patent is extended or adjusted under 35 U.S.C. 154(b) by 0 days.

(21) Appl. No.: 13/731,945

(22) Filed: Dec. 31, 2012

(65) Prior Publication Data
US 2014/0184098 A1    Jul. 3, 2014

(51) Int. Cl.
G05F 1/00 (2006.01)
H05B 37/02 (2006.01)
H05B 39/04 (2006.01)
H05B 41/36 (2006.01)

(52) U.S. Cl.
USPC ........... 315/311; 315/291; 315/297; 315/307; 315/310

(58) Field of Classification Search
None
See application file for complete search history.

(56) References Cited

U.S. PATENT DOCUMENTS

| | | |
|---|---|---|
| 6,307,424 B1 | 10/2001 | Lee |
| 2005/0057275 A1 | 3/2005 | Ngyuen et al. |
| 2008/0062602 A1 | 3/2008 | Raimondi et al. |
| 2008/0197786 A1* | 8/2008 | Schaible et al. ............... 315/224 |
| 2009/0021187 A1 | 1/2009 | Bhagat |
| 2010/0213859 A1 | 8/2010 | Shteynberg et al. |
| 2012/0032612 A1* | 2/2012 | Antony et al. ................. 315/297 |

OTHER PUBLICATIONS

PCT International Search Report and the Written Opinion of corresponding PCT/US2013/078337, May 1, 2014, pp. 1-8.

* cited by examiner

*Primary Examiner* — Anh Tran

(57) ABSTRACT

The present disclosure is directed to an input impedance control circuit. In one embodiment, the automatic input impedance control circuit includes a circuit controller that comprises a module for calculating an impedance and a control logic module, wherein the control logic module provides a current enable signal and a current control output signal, a driver in communication with the circuit controller for receiving the current enable signal and the current control output signal, an input voltage sensing circuit in communication with the module for calculating the impedance and the control logic module and an input current sensing circuit in communication with the module for calculating the impedance.

20 Claims, 3 Drawing Sheets

AUTOMATIC INPUT IMPEDANCE CONTROL

BACKGROUND

Modern light emitting diode (LED) lights are usually driven from constant current output drivers. In order to maintain the same LED current while the supply voltage changes, the input power to the light remains constant, hence the impedance of the light changes with supply voltage.

However, the intrinsic input impedance variation with supply voltage can cause problems. For example, such lights cannot be connected in series. If two lights were to be connected in series, a severe voltage imbalance will occur as one light becomes a low impedance and the other lights become a high impedance. One light will likely dim, while other lights end up with a high voltage across it. Depending on how high the supply voltage is, this may damage one of the lights. Due to the inevitable voltage imbalance problems, this type of light cannot be wired in a "Y" with floating neutral configuration, across a three phase supply, even if the loading per phase appears to be balanced.

For the above reasons, such lights can be damaged when connected to three phase systems and a neutral fault occurs (i.e., when the neutral to which the lights are connected becomes detached from the ground). Such faults are common in industrial lighting systems during installation and can occur at any time after installation. This results in a large voltage appearing across some of the lights on the circuit, which may exceed their rating, thereby, causing failure.

Universal input lights place additional strain on the power distribution systems when a low voltage condition occurs. This is because as the supply voltage drops they will continue to draw the same power, while increasing their input current. This is unlike traditional filament bulbs, for example, that will do the opposite during low voltage conditions.

SUMMARY

In one embodiment, the present disclosure provides an input impedance control circuit. In one embodiment, the input impedance control circuit includes a circuit controller that comprises a module for calculating an impedance and a control logic module, wherein the control logic module provides a current enable signal and a current control output signal, a driver in communication with the circuit controller for receiving the current enable signal and the current control output signal, an input voltage sensing circuit in communication with the module for calculating the impedance and the control logic module and an input current sensing circuit in communication with the module for calculating the impedance.

In one embodiment, the present disclosure provides a method for controlling an impedance of a circuit. In one embodiment, the method includes determining a threshold based upon an initial supply voltage, determining a minimum operating impedance, monitoring a supply voltage, determining the supply voltage is below the threshold and enabling a constant impedance mode of a driver in response to determining that the supply voltage is below the threshold by controlling a current to the driver to maintain the minimum operating impedance within a range based upon the supply voltage.

In one embodiment, the present disclosure provides a tangible computer-readable medium to store a plurality of instructions which, when executed by a processor, cause the processor to perform operations for controlling an impedance of a circuit. The operations include determining a threshold based upon an initial supply voltage, determining a minimum operating impedance, monitoring a supply voltage, determining the supply voltage is below the threshold and enabling a constant impedance mode of a driver in response to determining that the supply voltage is below the threshold by controlling a current to the driver to maintain the minimum operating impedance within a range based upon the supply voltage.

BRIEF DESCRIPTION OF THE DRAWINGS

So that the manner in which the above recited features of the present disclosure can be understood in detail, a more particular description of the disclosure, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

As discussed above, presently used constant current output drivers that power light emitting diode (LED) lights often cause input current to increase as supply voltage reduces in order to maintain constant input power and light output. Under certain conditions, this reduction of input impedance can have various negative consequences for the LED lights and power distribution network including complete failure of the LED lights.

One embodiment of the present disclosure provides an automatic input impedance control circuit that can maintain a constant impedance if the input voltage drops below a predefined threshold. One embodiment of the automatic input impedance control circuit uses a multi-mode driver that can be switched to operate in either a constant input power mode or a constant input impedance mode.

Figure 1:
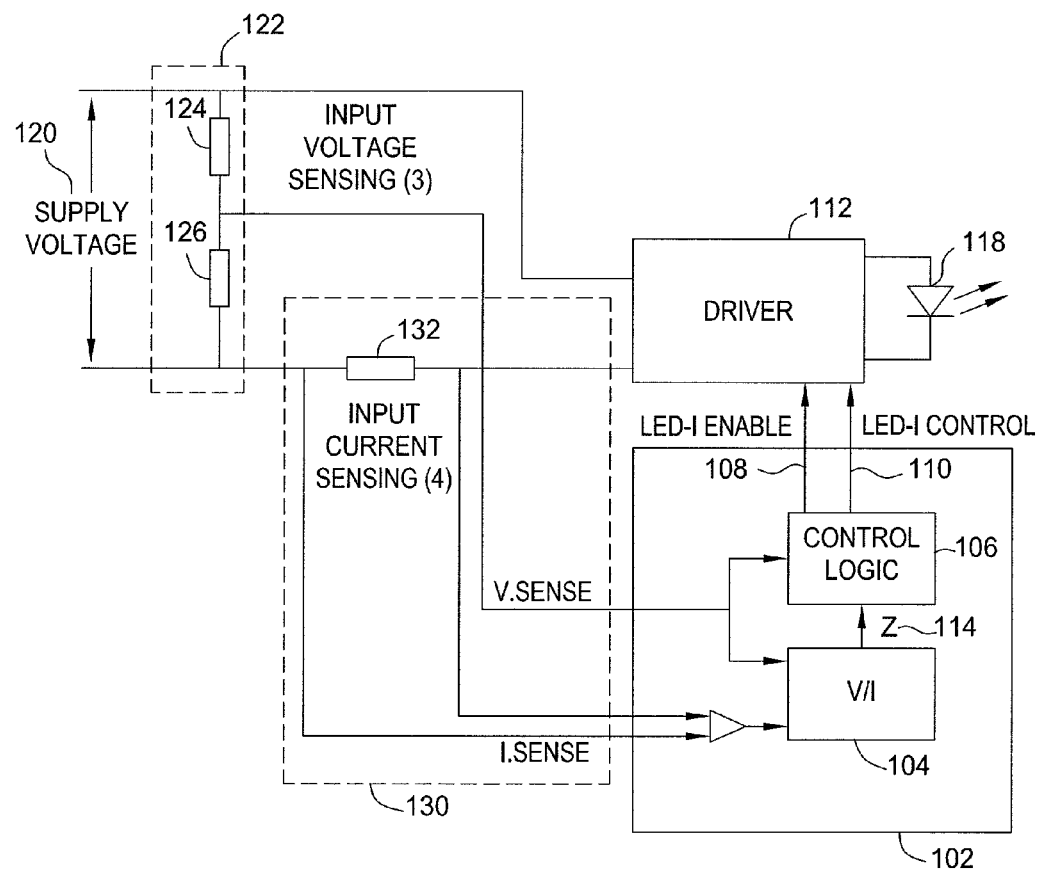
FIG. 1 depicts a block diagram of one embodiment of an example automatic input impedance control circuit.

FIG. 1 illustrates a high level block diagram of one embodiment of an automatic input impedance control circuit 100. In one embodiment, the circuit 100 includes a circuit controller 102, a driver 112 and a power supply 120. In one embodiment, the driver 112 may be a power factor corrected driver used to power an LED light 118.

In one embodiment, the circuit controller 102 may include a module for calculating an impedance 104 and a control logic module 106. In one embodiment, the module 104 may receive a current value and a supply voltage value from a current sensing circuit 130 and a voltage sensing circuit 122, respectively. The module 104 may then calculate the impedance value and pass the impedance value 114 to the control logic module 106.

In one embodiment, the control logic module 106 may also receive the supply voltage value from the voltage sensing circuit 122 and determine whether the driver 112 should operate in a constant input power mode or a constant input impedance mode. The control logic module 106 may control the operation of the driver with an enable signal 108 to the driver 112. For example, the enable signal 108 may provide a signal instructing the driver 112 to operate to deliver current to the LED light 118.

How much current that should be delivered to the LED light 118 is determined base upon the operating mode that is selected by the control logic module 106. For example, if the driver 112 is operating in a constant input impedance mode, the control logic module 106 may enable the driver 112 to operate with a current enable signal 108 and control the current with a current control signal 110 to the driver 112. For example, when the driver 112 is operating in the constant power mode, the current control signal 110 may instruct the driver 112 to produce maximum current. However, when the driver 112 is operating in the constant impedance mode, the current control signal 110 may instruct the driver 112 to adjust the current to maintain a constant input impedance.

In one embodiment, the input current sensing circuit 130 may include a resistor 132 typically having a low resistance of less than 1 ohm (Ω). For example, the resistor 132 may have a resistance of fractional ohms.

In one embodiment, the input voltage sensing circuit 122 may comprise a voltage divider. The voltage divider may include a first resistor 124 and second resistor 126. In one embodiment, the first resistor 124 may have a larger resistance value than the second resistor 126. For example, the first resistor 124 may have a resistance of at least 1,000,000Ω and the second resistor 126 may have a resistance of at least 5,000 Ω.

In one embodiment, the circuit controller 102 may be deployed as a computer processing unit (CPU), a customized application specific integrated circuit (ASIC) chip, a field programmable gate array (FPGA), and the like. The circuit controller 102 may be programmed to switch between a constant input power mode and a constant input impedance mode depending on an input voltage reading.

For example, during a start period when the power supply 120 is initially powered up or the circuit controller 102 is initially connected to the power supply 120, the circuit controller 102 may measure an input voltage. From the input voltage read at the start period, the circuit controller 102 may calculate a minimum operating impedance that the LED light 118 should operate at.

In addition, the circuit controller 102 may determine whether the LED light 118 should operate in a constant input power mode or a constant input impedance mode, depending on the supply voltage. In one embodiment, to determine which operating mode to select for the LED light 118, the circuit controller 102 may compare the supply voltage to a predetermined threshold. The predetermined threshold may be a percentage of a nominal voltage or an initial supply voltage sensed as the circuit 100 is powered on. For example, if the nominal voltage is 120 volts (V) detected during the start period and the predetermined threshold is 10% below the nominal voltage, the value of the predetermined threshold may be 108 V. Thus, in one example, if the input voltage falls below 108 V during operation, the circuit controller 102 may instruct the driver 112 to switch to a constant input impedance mode. It should be noted that although 10% is used as an example, the predetermined threshold may be any percentage that may be deemed as suitable for a particular application. For example, in another embodiment, the predetermined threshold may be approximately between 10% to 20% of the nominal voltage and so forth.

In one embodiment, the constant input impedance mode may maintain the operating impedance within a predefined range of the operating impedance. In one embodiment, the predefined range may be −5 percent to +5 percent. For example, if the operating impedance was calculated to be 81Ω during the start period, the predefined range may be between 77Ω and 85 Ω.

The operating impedance may be maintained by controlling the current. The circuit controller 102 may control how much current is delivered by the driver 112 to the LED light 118 via the current control output 110 of the circuit controller 102. The circuit controller 102 may continuously calculate the required current using the function $Z_{in}=V_{in}/I_{in}$, wherein $Z_{in}$ represents impedance, $V_{in}$ represents the input voltage and $I_{in}$ represents the input current. Thus, using the above example, the circuit controller 102 may try to maintain $Z_{in}$ between 77Ω and 85Ω by controlling the input current based upon the monitored changes in the input voltage.

In one embodiment, the circuit controller 102 may switch back to a constant input power mode if the input voltage rises back above the predefined threshold. In one embodiment, the circuit controller 102 may switch back to a constant input power mode if the driver is disconnected from the power supply or a default starting mode may be the constant input power mode.

It should be noted that FIG. 1 illustrates only one example of an automatic input impedance control circuit. In other words, other configurations of the circuit may be equally applicable and within the scope of the present disclosure.

Thus, the automatic input impedance control circuit of the present disclosure provides an advantageous modification in the way that LED lights are powered or driven. As a result, LED lights may be connected in a balanced Y arrangement with a floating neutral to 3-phase supply or in a series across a supply voltage that may exceed the voltage rating of each LED light. In addition, the LED lights will be less susceptible to damage as a result of neutral faults that can occur during installation or at any time after the installation. Furthermore, large groups of LED lights will place less strain on the power system in the event of an abnormally low supply voltage condition.

Figure 2:
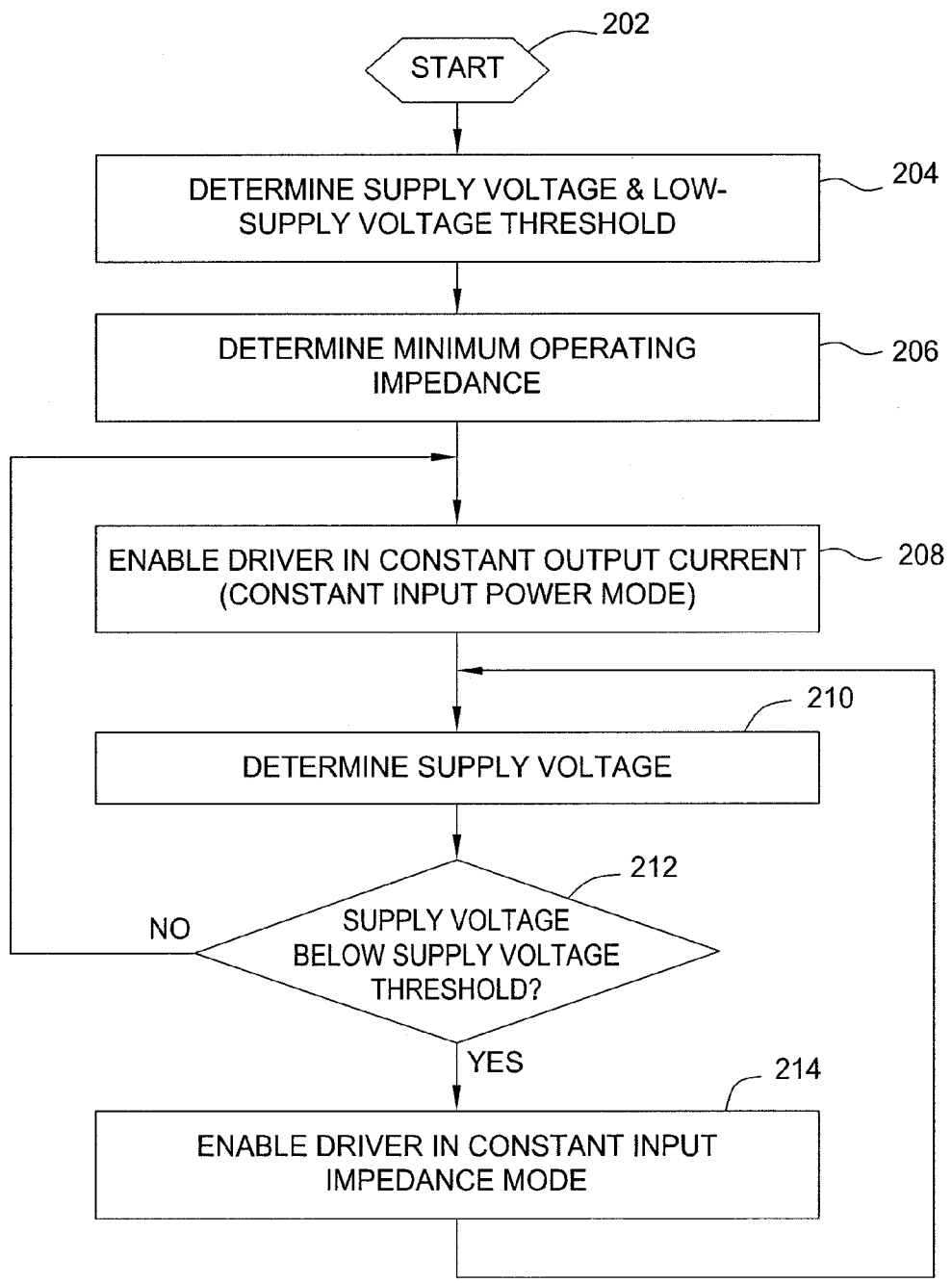
FIG. 2 depicts an example flow diagram of a method for automatically controlling an impedance of a circuit.

FIG. 2 illustrates an example flowchart of one embodiment of a method 200 for automatically controlling an impedance of a circuit. In one embodiment, the steps, functions, or operations of the method 200 may be performed by the circuit controller 102 in the automatic input impedance control circuit 100 or a general purpose computer illustrated in FIG. 3 and discussed below.

The method 200 begins at step 202. At step 204, the method 200 determines a supply voltage and a supply voltage threshold. For example, the input voltage sensing circuit may sense the initial supply voltage when the circuit is powered on and before allowing the LED current to flow. The initial supply voltage value may be provided to the control logic in the circuit controller. The control logic of the circuit controller may then set a supply voltage threshold based upon the supply voltage. In one embodiment, the supply voltage threshold may be set at 80% to 90% of an initial supply voltage (i.e., 10% to 20% below the initial supply voltage).

At step 206, the method 200 determines a minimum operating impedance. For example, when a power supply is initially powered up or the circuit controller is initially connected to the power supply, the circuit controller may measure the initial supply voltage. From the initial supply voltage reading at the start period, the circuit controller may calculate a minimum operating impedance that the LED light should operate at.

At step 208, the method 200 enables the driver to operate at a constant input power mode.

At step 210, the method determines the supply voltage. For example, the supply voltage may be continuously monitored and provided as an input by the input voltage sensing circuit to the circuit controller.

At step 212, the method 200 determines if the supply voltage is below a supply voltage threshold. The supply voltage threshold may be a percentage of a nominal voltage or the initial supply voltage reading obtained as the circuit was powered on. For example, if the initial supply voltage was 120 volts (V) during the start period and the supply voltage threshold is 10% below the initial supply voltage, the value of the supply voltage threshold may be 108 V. If the supply voltage is not below the supply voltage threshold, the method 200 may return to step 208 and continues to operate in a constant input power mode and monitor the supply voltage. In other words, the supply voltage can be continuously monitored until the supply voltage falls below the supply voltage threshold.

If the supply voltage is below the supply voltage threshold, the method 200 may proceed to step 214. At step 214, the method 200 enables a constant input impedance mode of a driver in response to determining that the supply voltage is below the supply voltage threshold. For example, the circuit controller may send an operating mode output signal to the driver to change the operating mode from a constant input power mode to a constant input impedance mode.

In one embodiment, the constant input impedance mode may operate by varying the current to the LED light so as to maintain the value of the impedance within a predefined range of the minimum operating impedance determined in step 206. In one embodiment, the predefined range may be −5 percent to +5 percent. For example, if the operating impedance was calculated to be 81Ω during the start period, the predefined range may be between 77Ω and 85 Ω.

The operating impedance may be maintained by controlling the current. The circuit controller may control how much current is delivered by the driver to the LED light via a current control output signal sent to the driver. The circuit controller may continuously calculate the required current using the function $Z_{in}=V_{in}/I_{in}$, wherein $Z_{in}$ represents impedance, $V_{in}$ represents the input voltage and $I_{in}$ represents the input current. Thus, using the above example, the circuit controller may try to maintain $Z_{in}$ between 77Ω and 85Ω by controlling the input current based upon the monitored changes in the supply voltage.

The method 200 then returns to step 210 to monitor the supply voltage. The method 200 may then repeat indefinitely between steps 208-214 depending on whether the supply voltage is above or below the supply voltage threshold.

It should be noted that although not explicitly specified, one or more steps or operations of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, operations or blocks in FIG. 2 that recite a determining operation, or involve a decision, do not necessarily require that both branches of the determining operation be practiced. In other words, one of the branches of the determining operation can be deemed as an optional step. Furthermore, operations, steps or blocks of the above described methods can be combined, separated, and/or performed in a different order from that described above, without departing from the example embodiments of the present disclosure.

Figure 3:
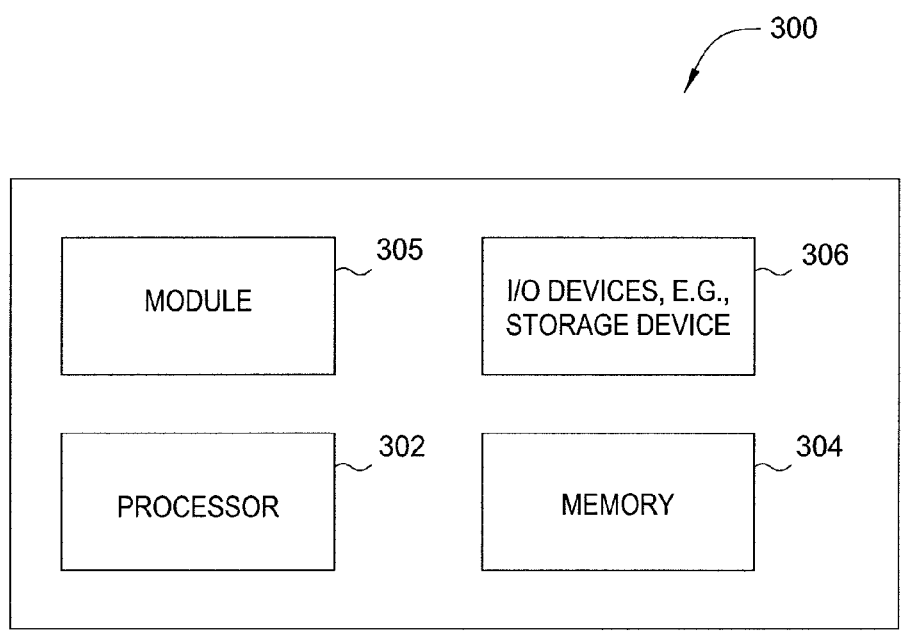
FIG. 3 depicts a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises a hardware processor element 302 (e.g., a CPU), a memory 304, e.g., random access memory (RAM) and/or read only memory (ROM), a module 305 for automatically controlling an impedance of a circuit, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps functions and/or operations of the above disclosed methods. In one embodiment, the present module or process 305 for automatically controlling an impedance of a circuit can be implemented as computer-executable instructions (e.g., a software program comprising computer-executable instructions) and loaded into memory 304 and executed by hardware processor 302 to implement the functions as discussed above. As such, the present method 305 for automatically controlling an impedance of a circuit as discussed above in method 200 (including associated data structures) of the present disclosure can be stored on a non-transitory (e.g., tangible or physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An input impedance control circuit, comprising:
a circuit controller comprising:
a module for calculating an impedance; and
a control logic module, wherein the control logic module provides a current enable signal and a current control output signal;
a driver in communication with the circuit controller for receiving the current enable signal and the current control output signal;
an input voltage sensing circuit in communication with the module for calculating the impedance and the control logic module; and
an input current sensing circuit in communication with the module for calculating the impedance.

2. The input impedance control circuit of claim 1, further comprising:
a supply voltage coupled to the circuit controller and the driver.

3. The input impedance control circuit of claim 1, further comprising:
a light emitting diode (LED) coupled to the driver.

4. The input impedance control circuit of claim 1, further comprising:
a plurality of light emitting diodes (LEDs) coupled to the driver in a Y with floating neutral configuration.

5. The input impedance control circuit of claim 1, wherein the input voltage sensing circuit comprises a voltage divider.

6. The input impedance control circuit of claim 1, wherein the voltage divider comprises a first resistor and a second resistor, wherein the first resistor has a higher resistance than the second resistor.

7. The input impedance control circuit of claim 6, wherein the first resistor has a resistance of at least 1,000,000 ohms and the second resistor has a resistance of at least 5,000 ohms.

8. The input impedance control circuit of claim 1, wherein the input circuit sensing circuit comprises a resistor having a resistance of less than 1 ohm.

9. A method for controlling an impedance of a circuit, comprising:
   - determining a threshold based upon an initial supply voltage;
   - determining a minimum operating impedance;
   - monitoring a supply voltage;
   - determining the supply voltage is below the threshold; and
   - enabling a constant impedance mode of a driver in response to determining that the supply voltage is below the threshold by controlling a current to the driver to maintain the minimum operating impedance within a range based upon the supply voltage.

10. The method of claim 9, wherein the initial supply voltage and the minimum operating impedance are determined upon an initial connection of the circuit to a power supply.

11. The method of claim 9, wherein the supply voltage is obtained by an input voltage sensing circuit.

12. The method of claim 9, wherein the current is obtained by an input current sensing circuit.

13. The method of claim 9, wherein the threshold comprises approximately 10 percent of the initial supply voltage.

14. The method of claim 9, wherein the range comprises approximately −5 percent to +5 percent of the operating impedance.

15. A tangible computer readable medium to store a plurality of instructions which, when executed by a processor, cause the processor to perform operations for controlling an impedance of a circuit, the operations comprising:
   - determining a threshold based upon an initial supply voltage;
   - determining a minimum operating impedance;
   - monitoring a supply voltage;
   - determining the supply voltage is below the threshold; and
   - enabling a constant impedance mode of a driver in response to determining that the supply voltage is below the threshold by controlling a current to the driver to maintain the minimum operating impedance within a range based upon the supply voltage.

16. The tangible computer readable medium of claim 15, wherein the initial supply voltage and the minimum operating impedance are determined upon an initial connection of the circuit to a power supply.

17. The tangible computer readable medium of claim 15, wherein the supply voltage is obtained by an input voltage sensing circuit.

18. The tangible computer readable medium of claim 15, wherein the current is obtained by an input current sensing circuit.

19. The tangible computer readable medium of claim 15, wherein the threshold comprises approximately 10 percent of the initial supply voltage.

20. The tangible computer readable medium of claim 15, wherein the range comprises approximately −5 percent to +5 percent of the operating impedance.

\* \* \* \* \*